(12) United States Patent
Morris et al.

(10) Patent No.: US 10,089,208 B1
(45) Date of Patent: Oct. 2, 2018

(54) PERFORMANCE CONTINUITY MANAGEMENT

(71) Applicant: Teradata US, Inc, Dayton, OH (US)

(72) Inventors: John Mark Morris, San Diego, CA (US); Anita Richards, San Juan Capistrano, CA (US); Douglas P. Brown, Rancho Santa Fe, CA (US)

(73) Assignee: Teradata US, Inc., Dayton, OH (US)

( * ) Notice: Subject to any disclaimer, the term of this patent is extended or adjusted under 35 U.S.C. 154(b) by 182 days.

(21) Appl. No.: 14/211,116

(22) Filed: Mar. 14, 2014

Related U.S. Application Data

(60) Provisional application No. 61/798,001, filed on Mar. 15, 2013.

(51) Int. Cl.
  *G06F 9/46* (2006.01)
  *G06F 11/34* (2006.01)
  *G06F 9/50* (2006.01)

(52) U.S. Cl.
  CPC ........ *G06F 11/3414* (2013.01); *G06F 9/5016* (2013.01)

(58) Field of Classification Search
  None
  See application file for complete search history.

(56) References Cited

U.S. PATENT DOCUMENTS

| | | | | |
|---|---|---|---|---|
| 6,859,926 B1* | 2/2005 | Brenner | ............... | G06F 9/5038 718/100 |
| 7,395,537 B1* | 7/2008 | Brown | ............. | G06F 17/30306 707/999.001 |
| 8,380,928 B1* | 2/2013 | Chen | ...................... | G06F 3/061 711/117 |
| 8,566,483 B1* | 10/2013 | Chen | ..................... | G06F 3/0605 710/18 |
| 9,063,861 B1* | 6/2015 | Derbeko | ............... | G06F 12/0866 |
| 2008/0221941 A1* | 9/2008 | Cherkasova | ............ | G06F 9/505 718/106 |
| 2009/0037922 A1* | 2/2009 | Herington | ............... | G06F 9/505 718/104 |
| 2010/0082300 A1* | 4/2010 | Hollingsworth | ...... | G06F 3/0605 702/186 |
| 2010/0162257 A1* | 6/2010 | Hiltunen | .................. | G06F 9/50 718/104 |

(Continued)

*Primary Examiner* — Kenneth Tang
(74) *Attorney, Agent, or Firm* — Randy L. Campbell, Jr.

(57) ABSTRACT

A data store system may include a storage array comprising a plurality of storage devices configured to store data. The data store may further include a processor array comprising a plurality of processors. The processor array may be in communication with the storage array. The processor array may receive workloads to be performed on the data. The processor may further process the workloads at a processing resource usage level of processing resources that is less than maximum available processing resources. The processing resource usage level may be associated with completion of at least a predetermined number of received workloads in accordance with the level of performance that is less than a total number of received workloads. The processor may further process the workloads at the processing resource level in response to presence of predetermined operating conditions. A method and computer-readable medium may also be implemented.

20 Claims, 11 Drawing Sheets

(56) References Cited

U.S. PATENT DOCUMENTS

2013/0007760 A1\* 1/2013 O'Sullivan ....... H04L 29/08468
                                                        718/104
2013/0074090 A1\* 3/2013 Kumar ................... G06F 9/505
                                                        718/104

\* cited by examiner

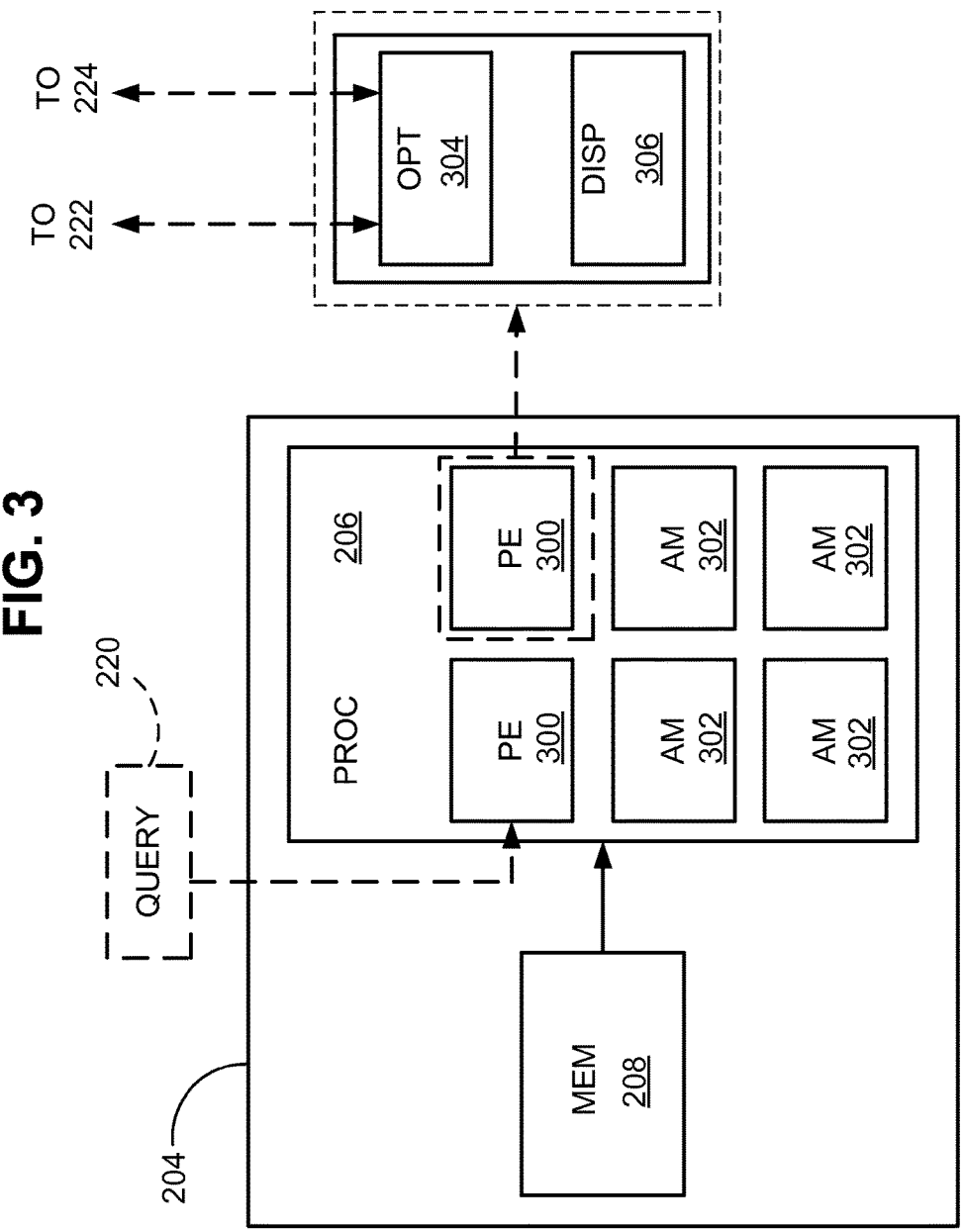

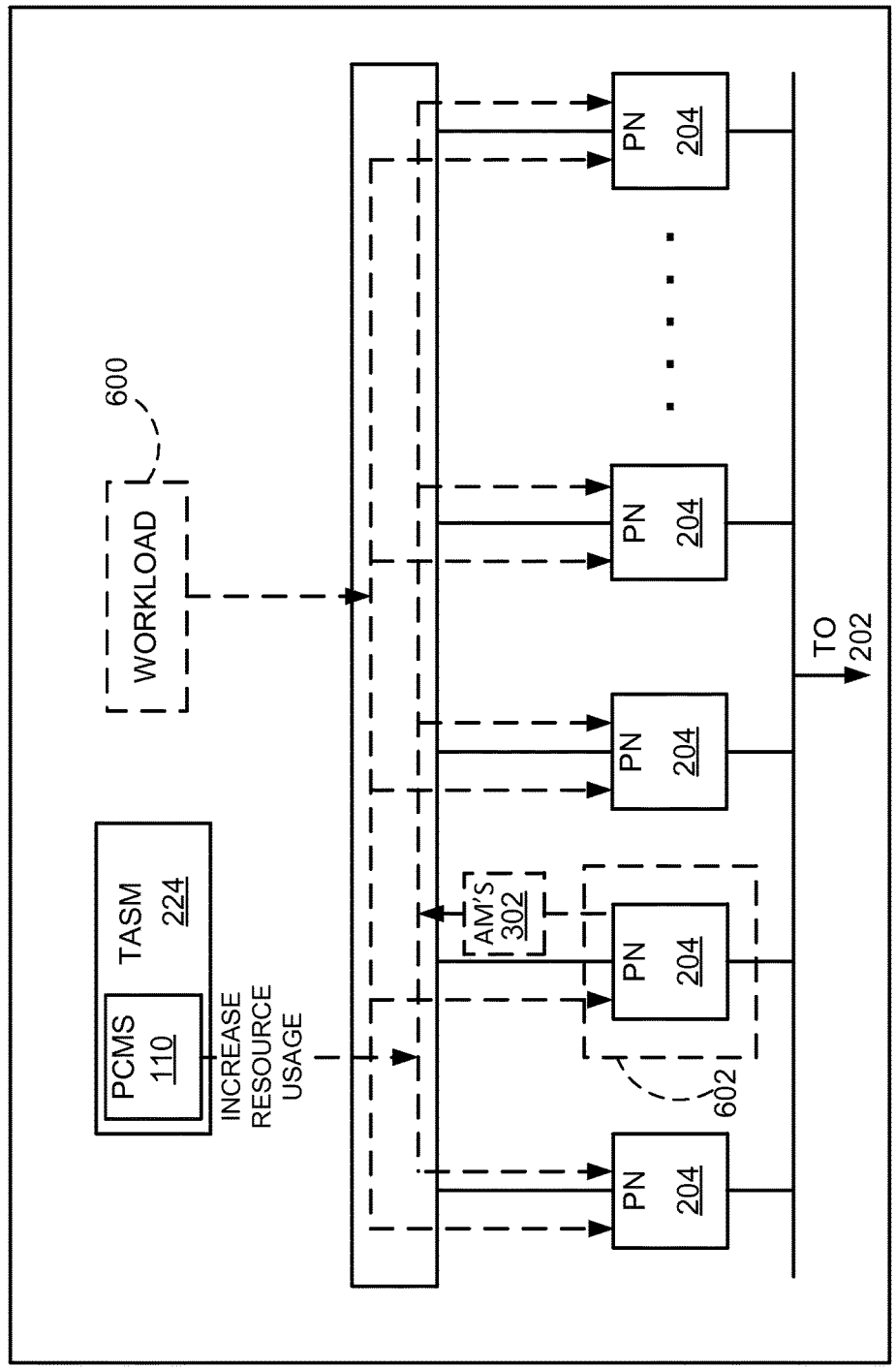

PERFORMANCE CONTINUITY MANAGEMENT

CLAIM OF PRIORITY

This application claims the benefit of priority under 35 U.S.C. § 119(e) of U.S. Provisional Patent Application Ser. No. 61/798,001 filed on Mar. 15, 2013, which is hereby incorporated by reference herein in its entirety.

BACKGROUND

1. Technical Field

The present disclosure relates generally management of resources in a data store system, and more particularly to, controlling available resources usage in a data store system based on performance goals.

2. Related Art

Data store systems, such as database systems, may be configured to process multiple workloads. Each workload may represent a related group of requests, such as database queries, through some commonality, such as performance level goals, source, type, etc. Performance level goals may refer to such terms as service level goals ("SLGs"), throughput, and resource level goals. In data store systems supporting multiple processors for parallel processing, many workloads can be processed in relatively short amounts of time. Completion of these workloads may be associated with various performance goals. Some data store systems may tolerate at least some workloads being completed at less than the performance goals. In such a scenario, processing resources of the data store system used to process workloads may be used at less than maximum capability, while still performing at tolerable levels. This situation allows for excess processing resources to exist and be strategically utilized.

SUMMARY

In one aspect of the present disclosure, a data store system may include a storage array comprising a plurality of storage devices configured to store data. The data store may further include a processor array comprising a plurality of processors. The processor array may be in communication with the storage array. The processor array may receive workloads to be performed on the data. The processor array may further process the workloads at a processing resource usage level of processing resources that is less than maximum available processing resources. The processing resource usage level may be associated with completion of at least a predetermined number of received workloads in accordance with the level of performance that is less than a total number of received workloads. The processor array may further process the workloads at the processing resource level in response to presence of predetermined operating conditions.

In another aspect of the disclosure, a method may include receiving workloads to be performed on data of a data store. The method may further include processing the workloads at a processing resource usage level of processing resources that is less than maximum available processing resources. The processing resource usage level may be associated with completion of at least a predetermined number of received workloads in accordance with the level of performance that is less than a total number of received workloads. The method may further include processing the workloads at the processing resource level in response to presence of predetermined operating conditions.

In another aspect of the disclosure, a computer-readable medium may be encoded with a plurality of instructions executable by a processor. The plurality of instructions may include instructions to receive workloads to be performed on data of a data store. The plurality of instructions may further include instructions to process the workloads at a processing resource usage level of processing resources that is less than maximum available processing resources. The processing resource usage level may be associated with completion of at least a predetermined number of received workloads in accordance with the level of performance that is less than a total number of received workloads. The plurality of instructions may further include instructions to process the workloads at the processing resource level in response to presence of predetermined operating conditions.

BRIEF DESCRIPTION OF THE DRAWINGS

The disclosure may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 3 is a block diagram of a portion of the example database system of FIG. 1.

FIG. 6 is a block diagram of operation of the example database system of FIG. 1.

DETAILED DESCRIPTION OF THE FIGURES

A database system may be used to load, delete, process, access, and otherwise manipulate data in the form of records stored in the database system. When handling any tasks (e.g. database queries) associated with accessing the database data, database users typically have specific expectations on how fast the tasks should take to be completed. These expectations may be driven by performance goals, such as service level goals (SLGs), which may provide a level of performance guaranteed to be provided by the database system. In some scenarios, a database system may operate using less than maximum resource availability to deliver results that fall within predetermined performance requirements. In such a situation, the excess resources may be held in reserve to be used during situations in which the excess resources are needed in order to meet the performance requirements.

In one example, a computing environment 100 may support a database system 102. The database system 102 may include a relational database management system (RDBMS). The database system 102 may include various resources 104. The resources 104 may include processing components and capabilities. Processing components and capabilities may include central processing units (CPUs), memory, input/output (I/O) capability, and any other system components and capabilities that may be implemented for various database processing.

Figure 1:
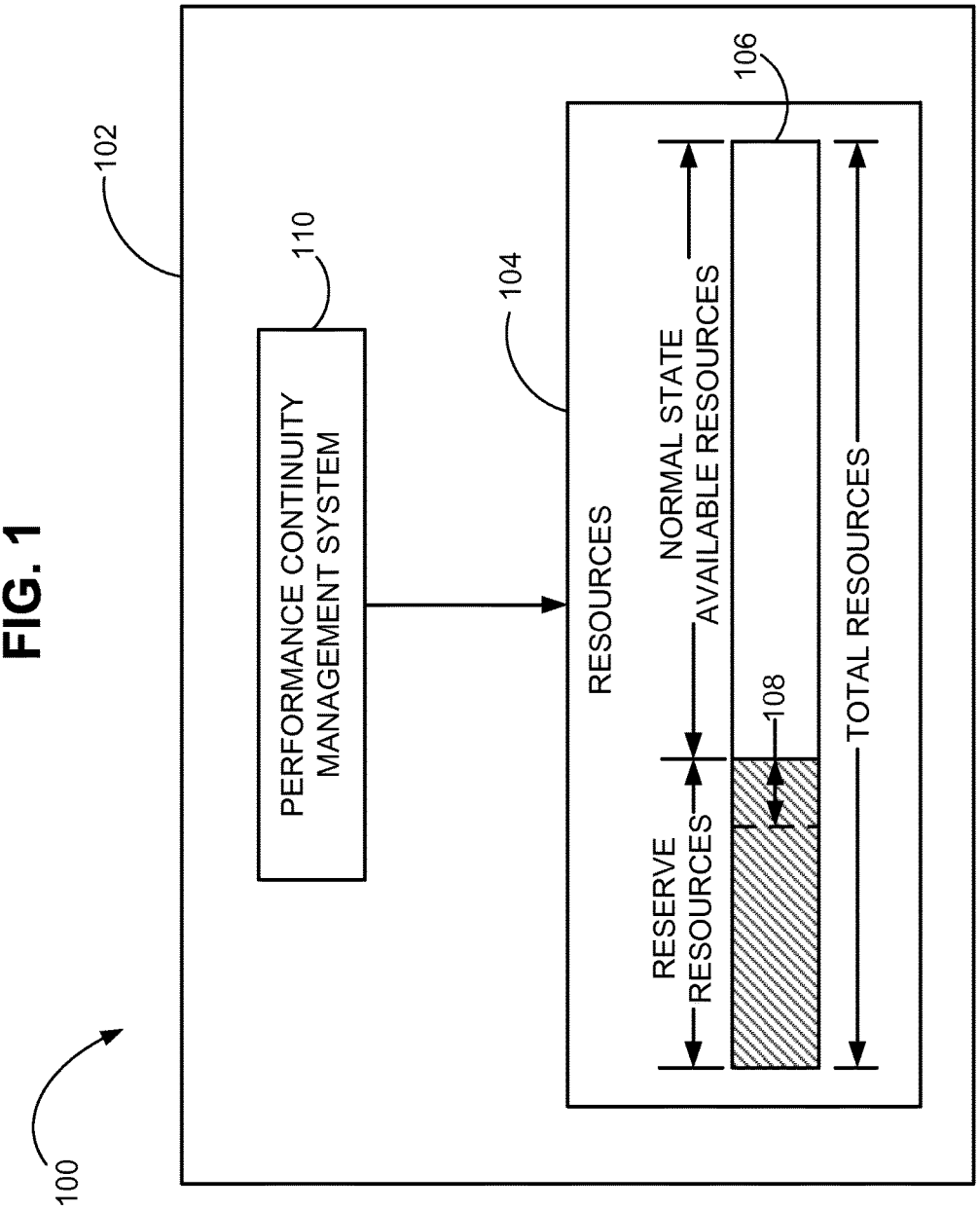
FIG. 1 is a block diagram of an example computing environment.

FIG. 1 includes a bar 106 illustratively representing distribution of resources 104. For example, the bar 106 may represent total available resources of the resources 104. However, due to predetermined considerations, only a portion of these resources 104 may be used during "normal operation" to meet the performance requirements, which is indicated by the unfilled portion of the bar 106 and designated as "normal operation resources." The "Reserve Resources" illustratively represented by the cross-hatched portion of the bar 106 represents the excess resources that may be unused even while the performance requirements are being met. An amount 108 of reserve resources may be adjusted during operation of the database system 102 in order to provide adequate resources to meet the performance requirements.

During normal operation, only the resources designated for normal operation may be accessible during operation of the database system 102. During this state, a portion of the resources 104, such as processors and I/O may be held in reserve. Upon occurrence of a critical condition, the performance continuity management system 110 may utilize the reserve resources to address system need in light of the critical conditions. Such critical conditions may include loss of designated available resources and unexpected demand for critical tasks, for example. Other critical tasks include scheduled demand for critical task performance or resources needed to perform a service task, data maintenance task, online re-sizing operation, or an online upgrade operation that may impinge on the normal workload performance. In alternative examples, the performance continuity management system 110 may be implemented in a multi-database system such as that in Teradata Unity®. In a multi-database system, the performance continuity management system 110 may utilize excess resources across the multiple database systems.

Figure 2:
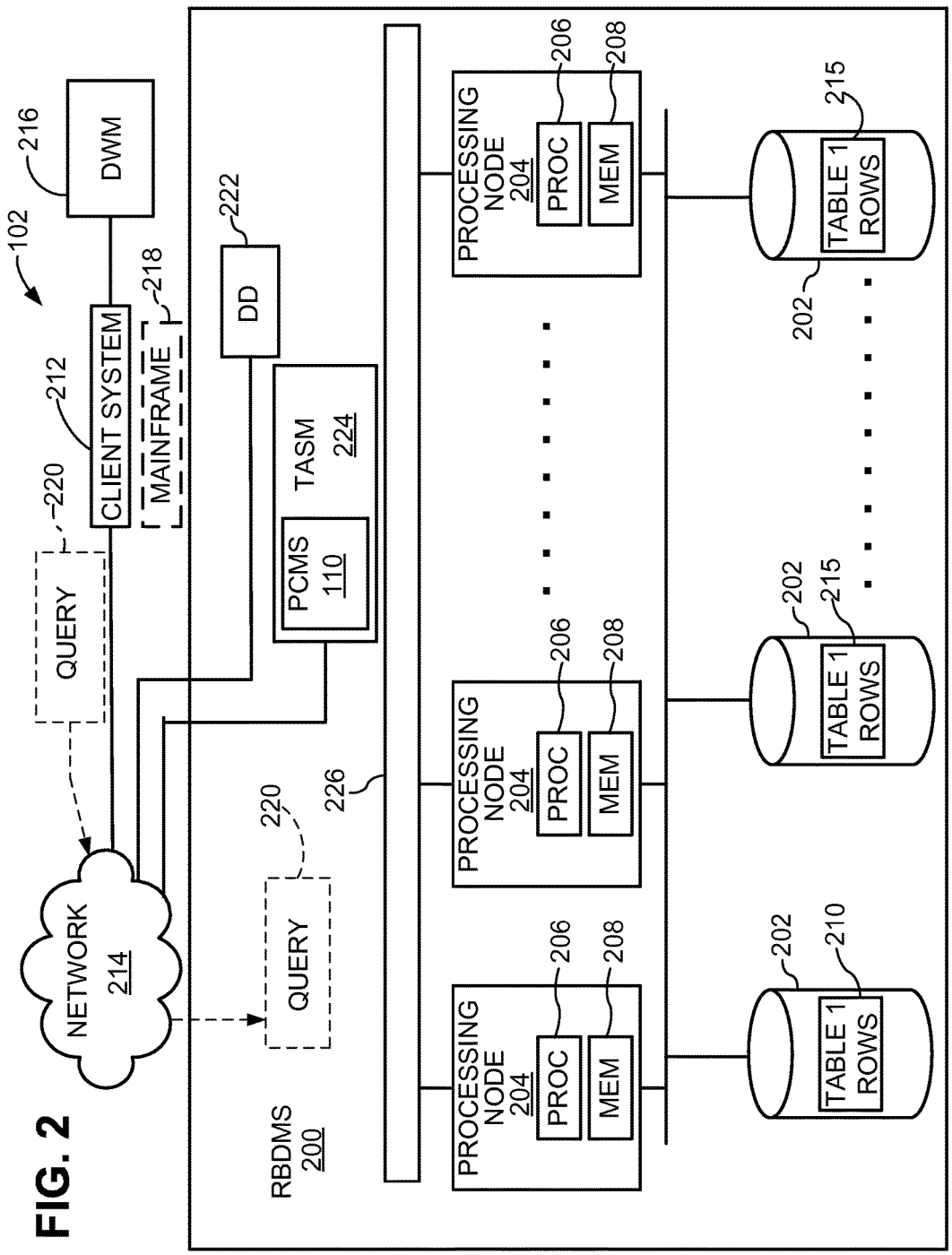
FIG. 2 is a block diagram of an example database system.

FIG. 2 is an example of the database system 102 that may implement the performance continuity management. FIG. 2 is a diagrammatic representation of example architecture for the database system 102, such as a Teradata Active Data Warehousing System®. In one example, the database system 102 includes a RDBMS 200 that implements a parallel-processing environment to carry out database management. The RDBMS 200 may be a combination of software (e.g., computer program routines, subroutines, applications, etc.) and hardware (e.g., processors, memory, etc.). In the example of FIG. 2, the RDBMS 200 may be a massive parallel processing (MPP) system having an array of processing units and distributed memory. In alternative examples, the RDBMS 200 may implement a single processing unit, such as in a symmetric multiprocessing (SMP) system configuration. The RDBMS 200 may include one or more processing units used to manage the storage, retrieval, and manipulation of data in data storage facilities (DSFs) 202. The array of processing units may include an array of processing nodes 204 that manage the storage, retrieval, and manipulation of data included in a database.

In one example, each processing node 204 may include one or more physical processors 206 and memory 208. The memory 208 may include one or more memories and may be computer-readable storage media or memories, such as a cache, buffer, RAM, removable media, hard drive, flash drive or other computer-readable storage media. Computer-readable storage media may include various types of volatile and nonvolatile storage media. Various processing techniques may be implemented by the processors 206 such as multiprocessing, multitasking, parallel processing and the like, for example.

As shown in FIG. 3, each processing nodes 204 may include one or more other processing unit arrays such as parsing engine (PE) modules 300 and access modules (AM) 302. As described herein, each module, such as the parsing engine modules 300 and access modules 302, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 208, for example, that comprises instructions executable with the processor 206 or other processor to implement one or more of the features of the module. When any one of the modules includes the portion of the memory that comprises instructions executable with the processor, the module may or may not include the processor. In some examples, each module may just be the portion of the memory 208 or other physical memory that comprises instructions executable with the processor 206 or other processor to implement the features of the corresponding module without the module including any other hardware. Because each module includes at least some hardware even when the included hardware comprises software, each module may be interchangeably referred to as a hardware module, such as the parsing engine hardware module or the access hardware module. The access modules 302 may be access modules processors (AMPs), such as those implemented in the Teradata Active Data Warehousing System®.

The parsing engine modules 300 and the access modules 302 may each be virtual processors (vprocs) and/or physical processors. In the case of virtual processors, the parsing engine modules 300 and access modules 302 may be executed by one or more physical processors, such as those that may be included in the processing nodes 204. For example, in FIG. 3, each parsing engine module 300 and access module 302 is associated with a respective processing node 204 and may each be executed as one or more virtual processors by physical processors 206 included in the respective processing node 204.

Each processing node 204 may include multiple parsing engine modules 300 and access modules 302 such that there are more parsing engine modules 300 and access modules 302 than processing nodes 204. In one example, during operation, the one or more physical processors 206 included in the processing nodes 204 may execute the parsing engine modules 300 and access modules 302 by switching between the executions of the various modules at a rapid rate allowing the vprocs to substantially operate in "parallel."

The RDBMS 200 stores data in one or more tables in the DSFs 202. The data may be stored in row format, columnar format, or some combination thereof. In one example of row format, rows 210 of a table, "Table 1," are distributed across the DSFs 202 and in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to DSFs 202 and associated access modules 302 by a hash bucket map. The characteristics of the columns chosen for the primary index determine how evenly the rows are distributed.

Rows of each stored table may be stored across multiple DSFs 202. Each parsing engine module 300 may organize the storage of data and the distribution of table rows. The parsing engine modules 300 may also coordinate the retrieval of data from the DSFs 202 in response to queries received, such as those received from a client computer system 212 connected to the RDBMS 200 through connection with a network 214. The network 214 may be wired, wireless, or some combination thereof. The network 214 may be a virtual private network, web-based, directly-connected, or some other suitable network configuration. In one example, the client computer system 212 may run a dynamic workload manager (DWM) client 216. Alternatively, the database system 100 may include a mainframe 218 used to interact with the RDBMS 200.

Figure 5:
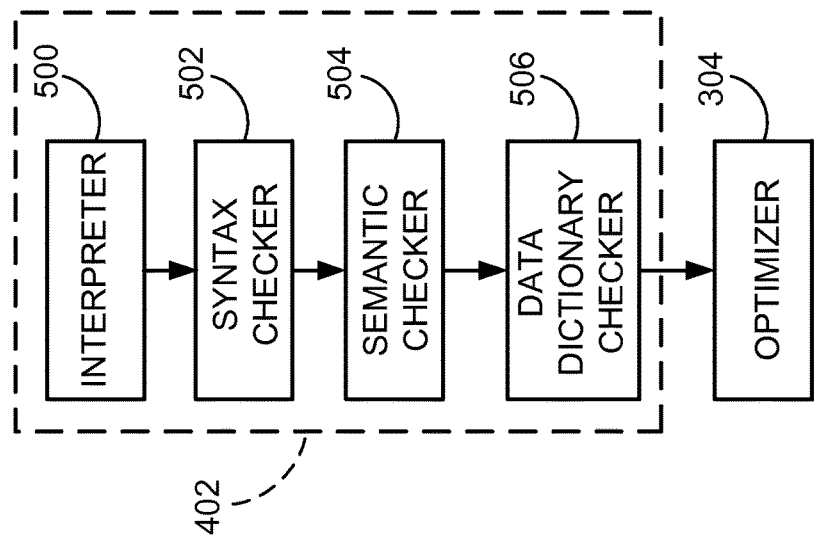
FIG. 5 is a block diagram of another portion of the example database system of FIG. 1.
Figure 4:
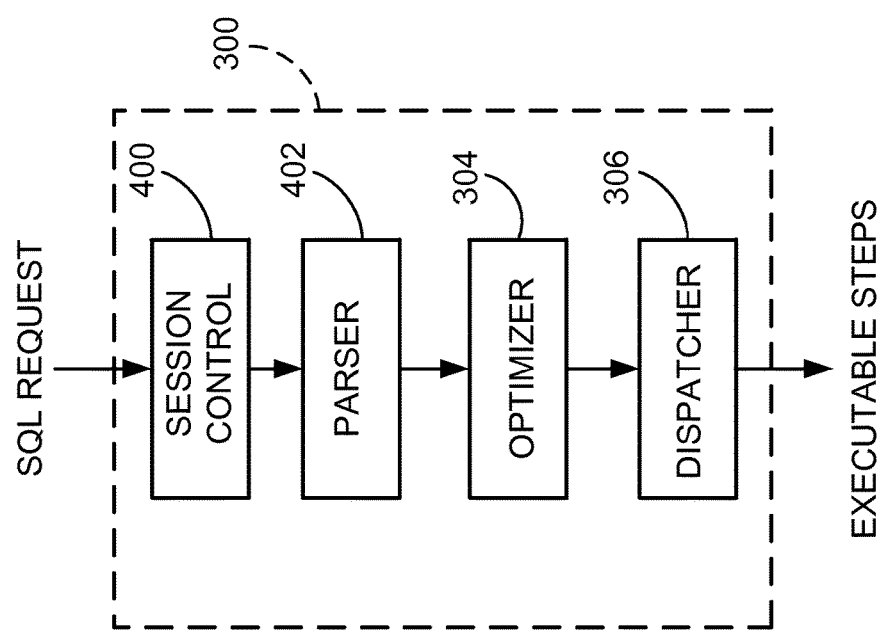
FIG. 4 is a block diagram of another portion of the example database system of FIG. 1.

Each parsing engine module 300, upon receiving an incoming database query, such as the query 220, may apply an optimizer module 304 to assess the best plan for execution of the query. An example of an optimizer module 304 is shown in FIG. 1 with regard to one of the parsing engine modules 300. Additional description of the parsing engine modules 300 is provided with regard to FIGS. 4 and 5. Selecting the optimal query-execution plan may include, among other things, identifying which of the processing nodes 204 are involved in executing the query and which database tables are involved in the query, as well as choosing which data-manipulation techniques will serve best in satisfying the conditions of the query. To this end, for each parsing engine module 300, a parser module 402 (see FIG. 4), and/or optimizer module 304 may access a data dictionary module 222, shown in FIG. 2 specifically for parsing engine module 208 for purposes of illustration.

The data dictionary module 222 may specify the organization, contents, and conventions of one or more databases, such as the names and descriptions of various tables maintained by the RDBMS 200 as well as fields of each database, for example. Further, the data dictionary module 222 may specify the type, length, and/or other various characteristics of the stored tables. The data dictionary module 222 may also maintain statistics on columns of the database tables being stored in the DSFs 212. The RDBMS 200 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary 222 may be stored in the DSFs 212 or some other storage device and selectively accessed.

The RDBMS 200 may include a workload management module, such as Teradata Active System Management (TASM) module 224. The TASM module 224 may be implemented as a "closed-loop" system management (CLSM) architecture capable of satisfying a set of workload-specific goals. In other words, the RDBMS 200 is a goal-oriented workload management system capable of supporting complex workloads and capable of self-adjusting to various types of workloads. The TASM module 224 may communicate with each optimizer module 304, as shown in FIG. 3, and is adapted to convey a confidence threshold parameter and associated parameters to the optimizer module 304 in communication. Further, the TASM module 224 may communicate with a dispatcher module 306 of each parsing engine module 300 (as shown in detail FIG. 4 for parsing engine module 300) to receive query execution plan costs therefrom, and to facilitate query exception monitoring and automated modifications of confidence threshold parameters in accordance with disclosed embodiments. Further, the DWM client 216 may communicate with the TASM module 224 via the network 214.

An interconnection 226 allows communication to occur within and between each processing node 204. For example, implementation of the interconnection 226 provides media within and between each processing node 204 allowing communication among the various processing units. Such communication among the processing units may include communication between parsing engine modules 300 associated with the same or different processing nodes 204, as well as communication between the parsing engine modules 300 and the access modules 302 associated with the same or different processing nodes 204. Through the interconnection 226, the access modules 302 may also communicate with one another within the same associated processing node 204 or other processing nodes 204.

The interconnection 226 may be hardware, software, or some combination thereof. In instances of at least a partial-hardware implementation the interconnection 226, the hardware may exist separately from any hardware (e.g, processors, memory, physical wires, etc.) included in the processing nodes 204 or may use hardware common to the processing nodes 204. In instances of at least a partial-software implementation of the interconnection 226, the software may be stored and executed on one or more of the memories 208 and processors 206, respectively, of the processing nodes 204 or may be stored and executed on separate memories and processors that are in communication with the processor nodes 204. In one example, the interconnection 226 may include multi-channel media such that if one channel ceases to properly function, another channel may be used. Additionally or alternatively, more than one channel may also allow distributed communication to reduce the possibility of an undesired level of communication congestion among processing nodes 204.

The TASM module 224 operation has four major phases: 1) assigning a set of incoming request characteristics to workload groups, assigning the workload groups to priority classes, and assigning goals (such as SLGs) to the workload groups; 2) monitoring the execution of the workload groups against their goals; 3) regulating (e.g., adjusting and managing) the workload flow and priorities to achieve the SLGs; and 4) correlating the results of the workload and taking action to improve performance. In accordance with disclosed embodiments, the TASM module 224 is adapted to facilitate control of the optimizer module 304 pursuit of robustness with regard to workloads or queries.

In one example system, each parsing engine module 300 includes three primary components: a session control module 400, a parser module 402, and a dispatcher module 306 as shown in FIG. 2. The session control module 400 provides the logon and logoff functions. It accepts a request for authorization to access the database, verifies it, and then either allows or disallows the access. Once the session control module 400 allows a session to begin, a SQL request may be received such as through submission by a user and the SQL request is routed to the parser module 402.

As illustrated in FIG. 3, the parser module 402 may include an interpreter module 500 that interprets the SQL request. The parser module 402 may also include a syntax checker module 502 that checks the request for correct SQL syntax, as well as a semantic checker module 504 that evaluates the request semantically. The parser module 402 may additionally include a data dictionary checker 506 to ensure that all of the objects specified in the SQL request exist and that the user has the authority to perform the request. The parsing engine module 300 implements the optimizer module 304 to select the least expensive plan to perform the request, and the dispatcher module 306 coordinates the runtime execution of executable steps of the query execution plan of the optimizer module 304 with the access modules 302.

In one example, to facilitate implementations of automated adaptive query execution strategies, such as the examples described herein, the TASM module 224 is configured to monitor runtime exception criteria. The TASM module 224 monitoring takes place by communicating with the dispatcher module 306 as it checks the query execution step responses from the access modules 302. The step responses include the actual cost information, which the dispatcher module 306 may then communicate to the TASM module 224 which, in turn, compares the actual cost information with the estimated costs of the optimizer module 304.

In one example, the PCMS 110 may be implemented as part of the TASM module 224 (see FIG. 2). In alternative configurations, the PCMS 110 may be an independent system that coordinates with the TASM module 224. During operation of the database system 102, the query 220 may include one or more workloads. Each workload may represent some particular group of tasks with some common association, such as common source, common purpose, or some other common characteristic. In one example, the database system 102 may be configured to operate at a "normal" operating state that is less than maximum resource usage, which may cause less than all performance goals to be met. However, some database systems may tolerate such performance due to various considerations, such as acquisition capital expenditure costs, service cost operating expenditures, or internal budget issues. The PCMS 100 may be used to maintain a predetermined level of resource usage, such as CPU or I/O. In one example, the amount of resource usage may correspond to the amount of throughput in the database system 102. With such a relationship, a performance continuity level may indicate the amount of throughput in the database system. Thus, if a customer has determined that a performance continuity level of 80% is adequate, the resource usage level is set to 80%, which results in 80% throughput meeting performance level goals (e.g., queries per second, etc.). Such a scenario allows 20% of the resources to be used for critical conditions. In other examples, combinations of performance goals and/or performance aspects may be used to define the performance continuity levels. For example, SLGs and system CPU levels may be used to measure the overall success of the system. Also, throughput-based SLGs, time-based SLGs, and/or CPU-based system-sizing metrics may also be used in combination or separately.

In scenarios at which the performance continuity level uses less than the maximum resource capability of the database system 102, resources inaccessible by the database system 102 during normal operation may be held in abeyance and used in particular situations, such as to maintain certain the performance continuity level in unexpected situations. For example, in FIG. 6, the database system 100 may be processing a workload 600, with each processing node 204 participating at some performance continuity level. However, one processing node 204, referred to herein as failed node 602, may fail for some reason, such as a hardware and/or software failure. In order to maintain the performance continuity level, the PCMS 110 initiates performance continuity management, which may include directing one or more properly-functioning processing nodes 204 to communicate with other properly-functioning processing nodes 204 in order to receive processes currently being performed by the access modules 302 of the failed processing node 602. Thus, the access modules 302 of the failed node 602 migrate from the failed processing node 602 to the other functioning processing nodes 204. In other words, dedicated responsibilities of the access modules 302 of the failed processing node 602 may be moved to other, properly-operating processing nodes 204. This migration may require that one or more of the processing nodes 204 increase local resource usage in order to execute the migrated processes that were being executed on the failed processing node 602. Thus, the PCMS 110 may allow a particular amount of reserved resources to be used in order to maintain the performance continuity level associated with processing of the workload 600.

The PCMS 110 may also allow reserved resources to be used by the processing nodes 204 in other scenarios to maintain the performance continuity level. For example, the workload 600 may be unexpectedly large for a particular time of day. Thus, resources beyond those initially dedicated to the performance continuity level may be required in order to complete a particular workload, such as a critical task. In such a scenario, the PCMS 110 may direct the processing nodes 204 to dedicate more resources in order to maintain performance continuity, which may include CPU, I/O, and/or memory resources, for example.

Figure 7:
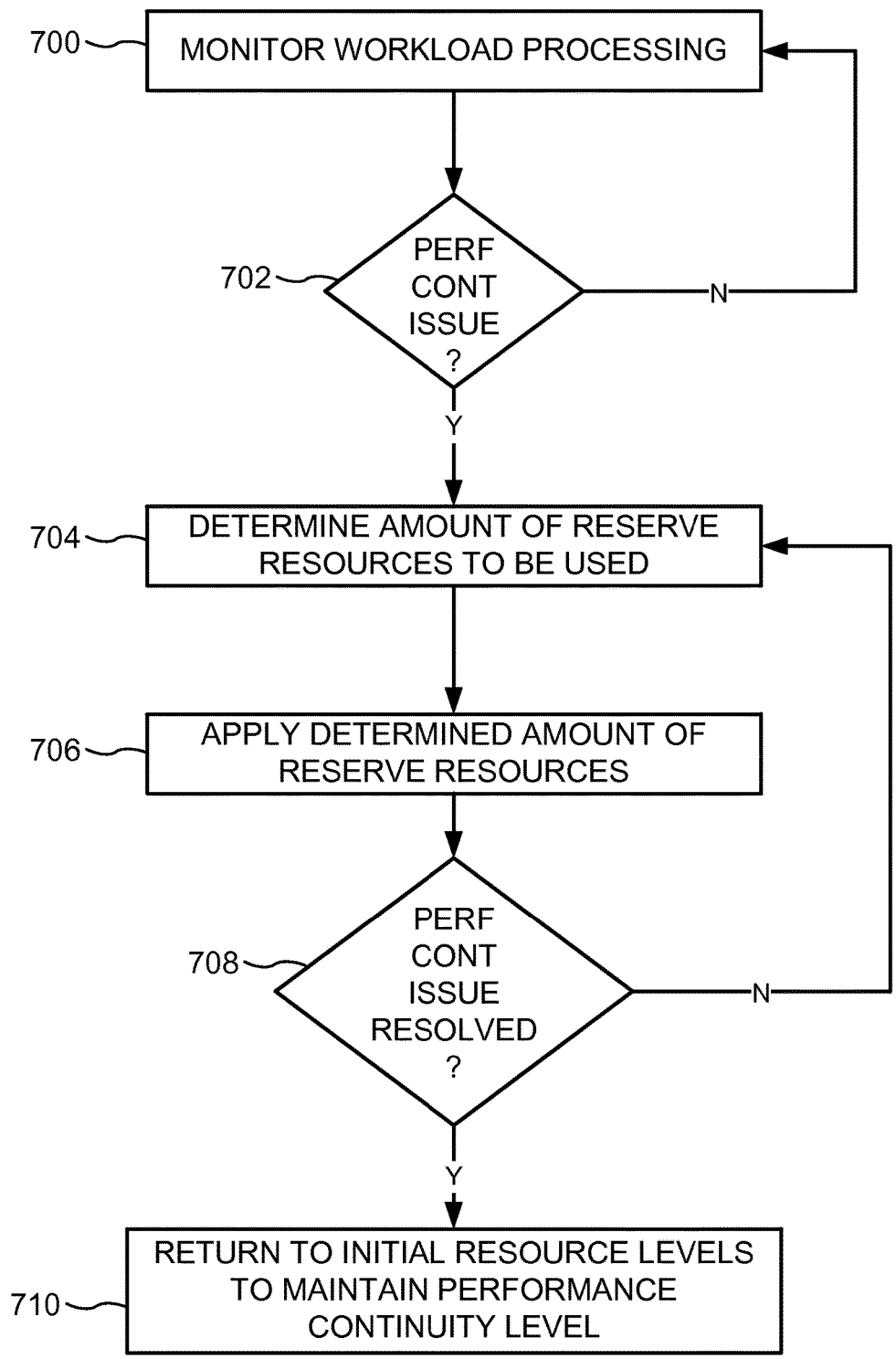
FIG. 7 is an operational flow diagram of example operation of a database system implementing performance continuity management.

FIG. 7 is an operational flow diagram of example operation of the database system 102 with performance continuity management capabilities. In one example, the database system 102 may monitor workload processing of a workload (700). The monitoring may be maintained if no performance continuity issue exists (702). Issues may arise due to the presence of a critical condition that may include one or more failed processing nodes 204 or unexpected workloads, for example. In the case of a performance continuity issue, the database system 102 may determine an amount of reserve resources to be used in order to maintain the performance continuity level (704). Once the amount needed is determined, the database system 102 may apply the determined amount of reserve resources (706). In one example, this may include directing one or more processing nodes 204 to increase the amount of resources being dedicated to workload processing, thus increasing the resource usage to meet the performance continuity level. A determination of whether the performance continuity issue continues to exist or has been resolved may be made (708). If the performance continuity issue persists, the database system 102 may continue to determine the amount of reserve resources to be used (704) and applies the reserve resources (706). Once the condition(s) causing the excess resources are no longer present (708), the reserve resources may again become inaccessible and the database system 102 may continue to maintain the performance continuity level at the initial resource usage levels (710).

Figure 8:
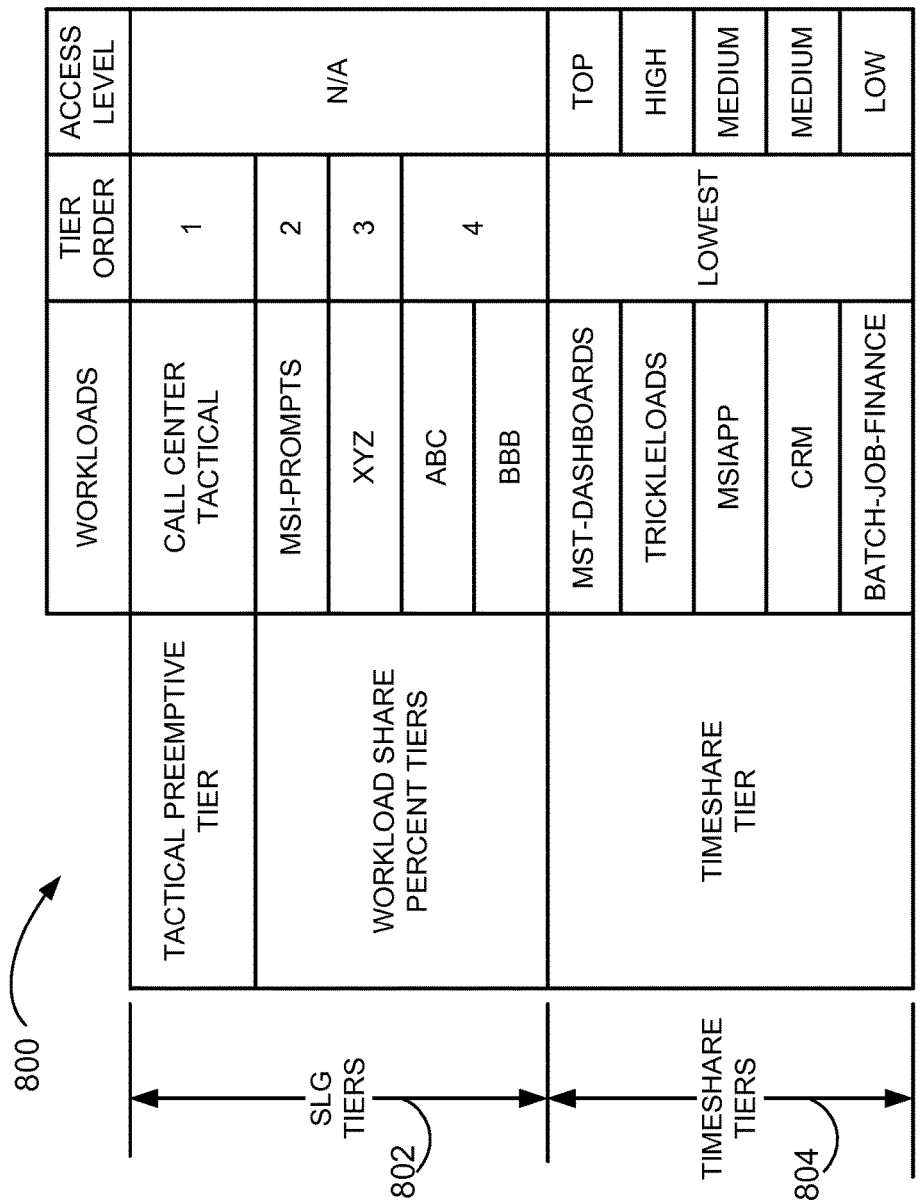
FIG. 8 is a table of example workload distributions using tiered workloads.

In one example, the PCMS 110 may be implemented with a tiered-workload strategy managed by the TASM module 224. In these example scenarios, workloads may be assigned to a priority tier, which designates the order in which workloads preempt one another with respect to processing. For example, a workload associated with the highest tier would preempt all other lower-tiered workloads being processed. FIG. 8 is a table showing a workload distribution using a tiered strategy. Table 800 illustrates an example of how the tiers may be implemented. In one example, two tiers may be implemented: SLG tiers 802 and timeshare tiers 804. SLG tiers 802 may include real-time requests. Requests associated with a SLG may also include a relative tier order with respect to other requests in the SLG tier. For example, in the SLG tiers 802, requests in the "Tactical Preemptive Tier," such as "Call Center Tactical" workloads are in the highest tier—tier 1. Other workloads, such as those in the "Workload Share Percent Tiers" include a respective tier order within the same workload and with respect to other workloads in the SLG tiers 802. For example, workload "XYZ" has a priority level of "3," which represents the priority with respect to all workloads within the SLG tiers 802 and is behind only one workload—"MSI-Prompts"—in the common Workload Share Percent Tier of the SLG tiers 802. The priority levels allow the database system 102 to determine which workloads are to receive attention before other workloads in order to meet the SLGs. Thus, the database system 102 will attempt to meet requests of the workload having the highest priority in the SLG tiers 802 through allocation of available resources before any other workload is allocated resources.

The timeshare tiers 804 represent workloads that may receive allocated resources with resources not needed to meet the workloads in the SLG tiers 802. Workloads in the SLG tiers 802 preempt any workloads of the timeshare tiers 804 if resources are needed for the workloads of the SLG tiers 802. Thus, tier order is inapplicable to the timeshare tier 804. No workload from the timeshare tiers 804 can have priority with respect to workloads in the SLG tiers 802.

In one example, deterministic techniques may be implemented to determine how resources allocated to the timeshare tiers 804 are to be distributed amongst the workloads. For example, discrete levels may be used to dedicate a predetermined portion of available resources to each workload of the timeshare tiers 804. For example, the levels may include "top," "high," "medium," and "low." Each level may include a predetermined percentage of available resources with "top" receiving the highest percentage and "low" receiving the lowest percentage.

In some scenarios, while degradation of service for the workloads of the SLG tiers 802 may not be tolerated, some degradation may be tolerated for the workloads of the timeshare tier 804. Once a degradation level is set, the resources usage percentage may be set allowing the PCMS 110 to monitor resource usage and adjust based on an occurrence of any critical conditions. For example, workloads of the timeshare tiers 804 may typically consume 80% of the resources in the database system 100, while the workloads of the SLG tiers consume 20%. The workloads of the SLG tier 802 must operate at 100% performance continuity, but the workloads of the timeshare tiers 804 can operate at 75% performance continuity, the overall performance continuity level may be set at 80%.

Figure 9:
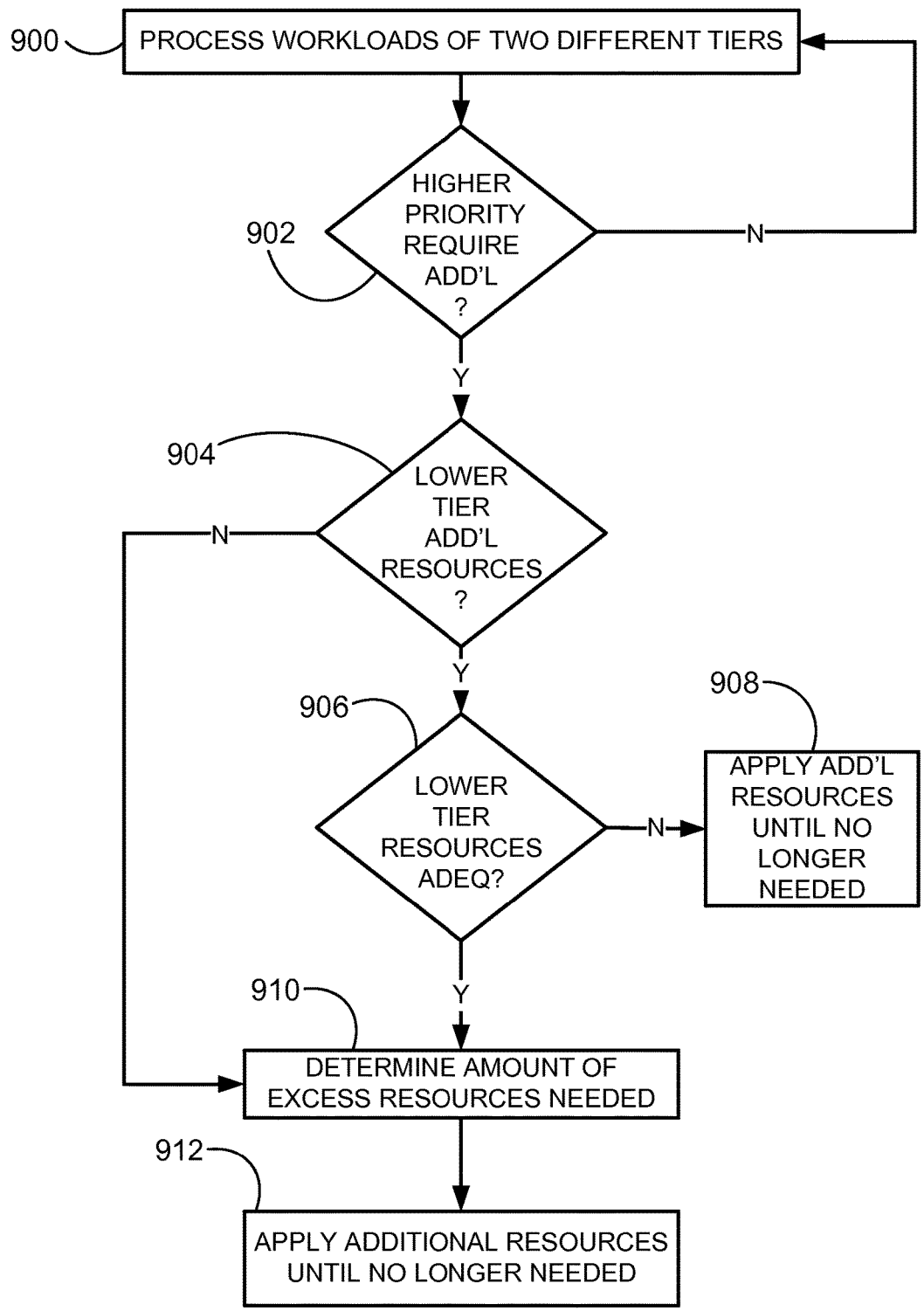
FIG. 9 is an operational flow diagram of example operation of a database system using performance continuity management to manage tiered workloads.

FIG. 9 is an operational flow diagram of example operation of the database system 102 during monitoring and maintaining performance level goals in a multi-tier workload scenario. In one example, the database system 102 may process workloads of a two separate tiers having different performance continuity levels (900) with one workload tier having a higher priority in the database system 102 having an overall performance continuity level achievable at less than maximum resource capability. The database system 102 may determine that a higher-priority tier requires additional resources to maintain performance level goals (902), which may be due to various critical conditions, such as unexpected workload amounts or system component malfunction. If the higher-priority tier requires additional resources, the database system 102 may determine whether or not the lower-priority tier has available resources (904), such as when workload processing of second-tier workloads uses less than the allocated amount of resources. If the resources are available, the database system 102 may determine if the available resources are adequate to meet the needs of the first tier workloads (906). If so, the second-tier resources may be used for the first-tier workload processing until no longer needed (908). If no resources of the second-tier are available or if the available second tier resources are inadequate to meet the first-tier needs, the database system 102 may determine the amount of excess resources needed to maintain the performance level continuity of the first-tier (910). Once determined, the excess resources may be applied toward first-tier workload processing until no longer needed (912).

In another example, workloads may have different SLGs and/or performance goals defined for different periods, such as day versus night versus month-end versus loading periods. These "planned environments" may be triggered based on predetermined conditions, such as time-based triggers, for example, or through user-defined events, such as commencement of data loading or system-component failure. Within each planned environment, workload management may be implemented in independent manners with respect to the same workload. For example, a workload can be changed in classification from the highest tier to the lowest tier, priority levels within a tier can be adjusted, or certain work may be rejected from being executed. In one example, through the PCMS 110, different performance continuity levels can be associated with one planned environment versus another. For example, the performance continuity level during daytime production weekend hours for a particular enterprise may only require a setting of 50% versus a higher performance continuity level for weekday hours.

Figure 10:
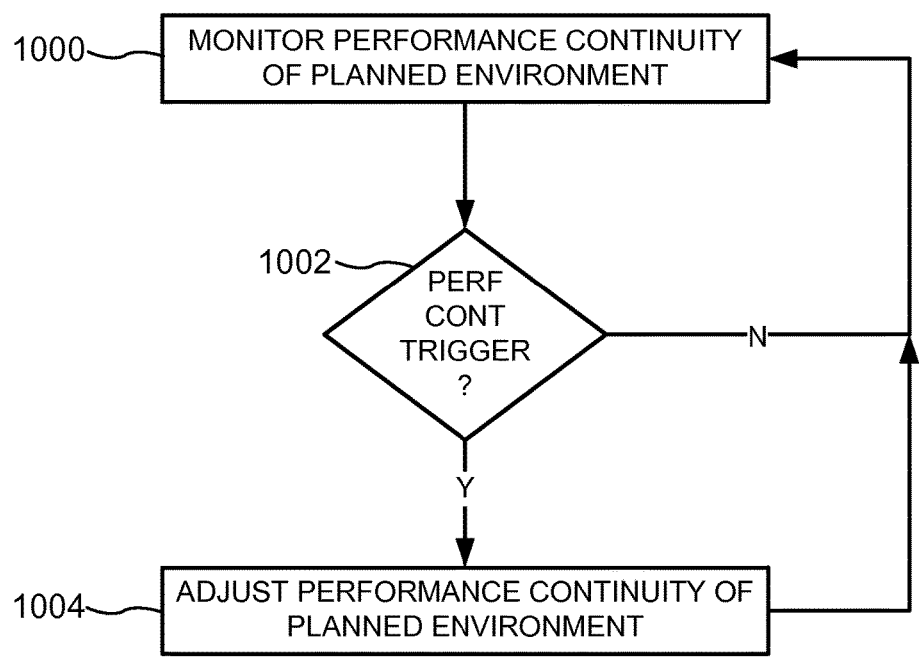
FIG. 10 is an operational flow diagram of example operation of a database system using performance continuity management to manage planned environments.

FIG. 10 is an operational flow diagram of an example of the database system 102 using the planned environments. In one example, the database system 102 may monitor a performance continuity of a particular planned environment (1000). The database system 100 may determine whether or not a performance continuity trigger has been detected (1002). Performance continuity triggers in planned environments may include various trigger events, such as time-based triggers, event-based triggers (e.g. priority level changes), and user-based triggers, for example. Upon detection of the trigger event, the database system 102 may adjust the performance continuity level of the planned environment in accordance with the plan, which may be an increase or decrease in available resources to the planned environment (1004) and may be maintained until another trigger is detected.

In another example, virtual partitions may be used in order to allow organizational units of an enterprise to share the same database system. For example, an enterprise may have business units in Germany, Hong Kong, and the United States. Each business unit may be represented by a virtual partition within the database system 102. The virtual partitions allow a single database system, such as the database system 102, to serve each business unit independently with respect to an allocated amount of resources, but with the ability to transfer the allocated resources between the virtual partitions.

Figure 11:
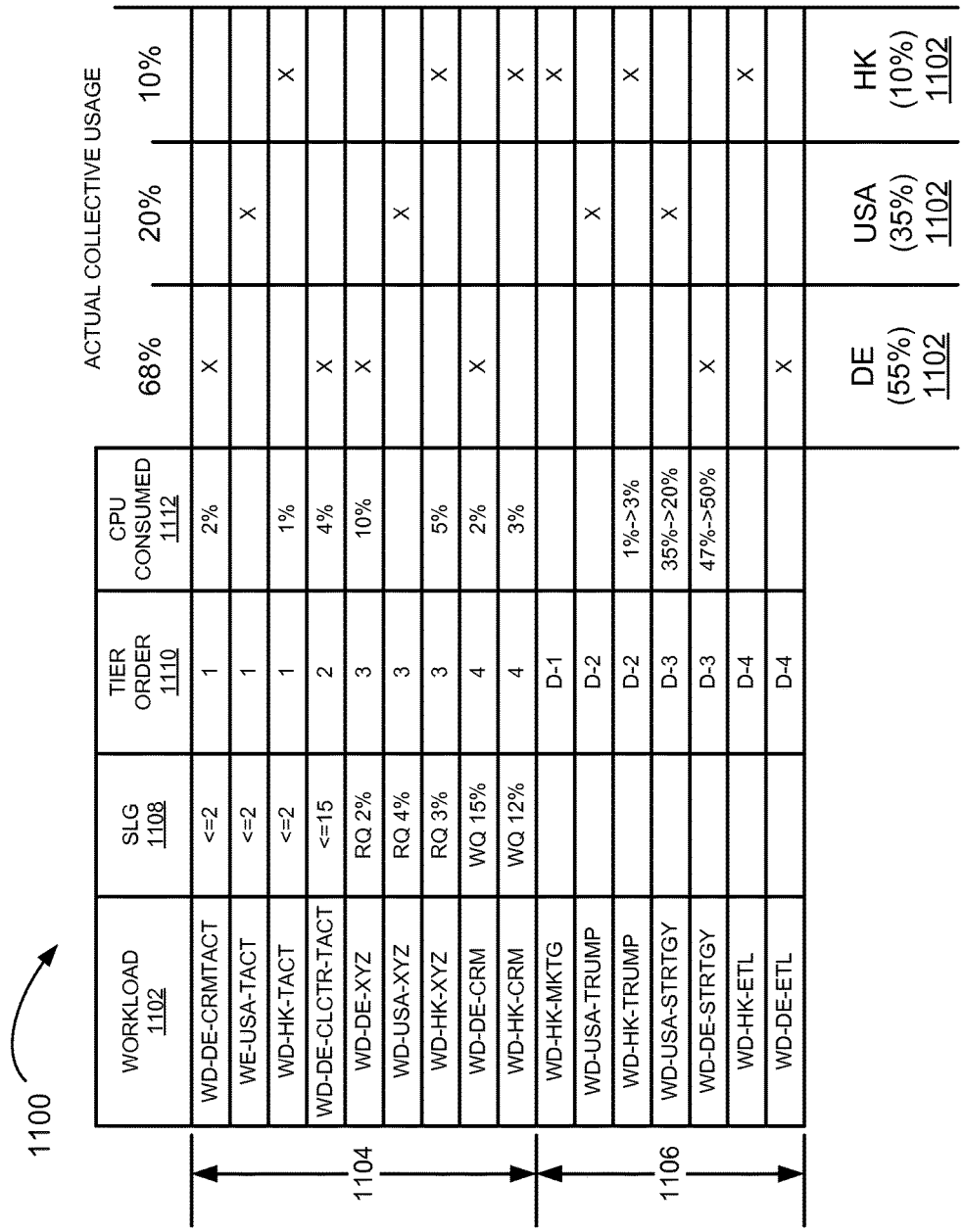
FIG. 11 is a table of example workload distribution using virtual partitions.

For example, FIG. 11 provides a table 1100 illustrating a manner in which the PCMS 110 may be applied to virtual partitions 1102. The workloads 1104 include those in SLG tiers 1104 and timeshare tiers 1106. The workloads in FIG. 11 are designated with an abbreviation corresponding to the respective business unit. For example, the workload WD-DE-CRMTACT is associated with the German business unit. In one example, each virtual partition may be allocated a share of available a resources. The table 1100 also indicates the SLG 1108 associated with each workload. The table 1100 also indicates the tier order 1110 for each workload, which is indicative of the priority level of each workload of the SLG tiers 1104 and the access level for each workload of the timeshare tier 1106. Table 1100 also indicates the amount of CPU resources 1112 being used.

Each virtual partition 1102 may also be associated with a performance continuity level. The PCMS 110 may then allow each virtual partition 1102 to be independently managed in terms of performance continuity level. For example, the German (DE) virtual partition may be given 55% of the available resources, the United States (US) virtual partition may be given 35% of the available resources, and the Honk Kong (HK) virtual partition may be given 15% of the available resources. During operation each virtual partition 1102 may provide unused resources to other virtual partitions 1102 if needed to meet demand. In one example, the allocated resources for each allocated virtual partition may include a respective performance continuity level. For example, for the German, US, and HK partitions, each may have performance continuity levels of 80%, 70%, and 90% respectively. In one example, these may be additively combined to determine a system-side performance continuity level.

Each virtual partition 1102 may be nested such that each virtual partition includes sub-virtual partitions. For example, the US virtual partition 1102 may include three business units, such as Retail, Corporate (Corp), and Testing and Development (T&D). Each of those three may be provided a respective amount of the US VP resources. For instance, the Retail VP may be given 60%, the Corp VP may be given 30%, and the T&D VP may be given 10%. Each of these may be reduced by a respective amount similar the VPs previously discussed. For example, each of the sub-VP's may operate at 90% (Retail), 80% (Corp), and 70% (T&D).

Figure 12:
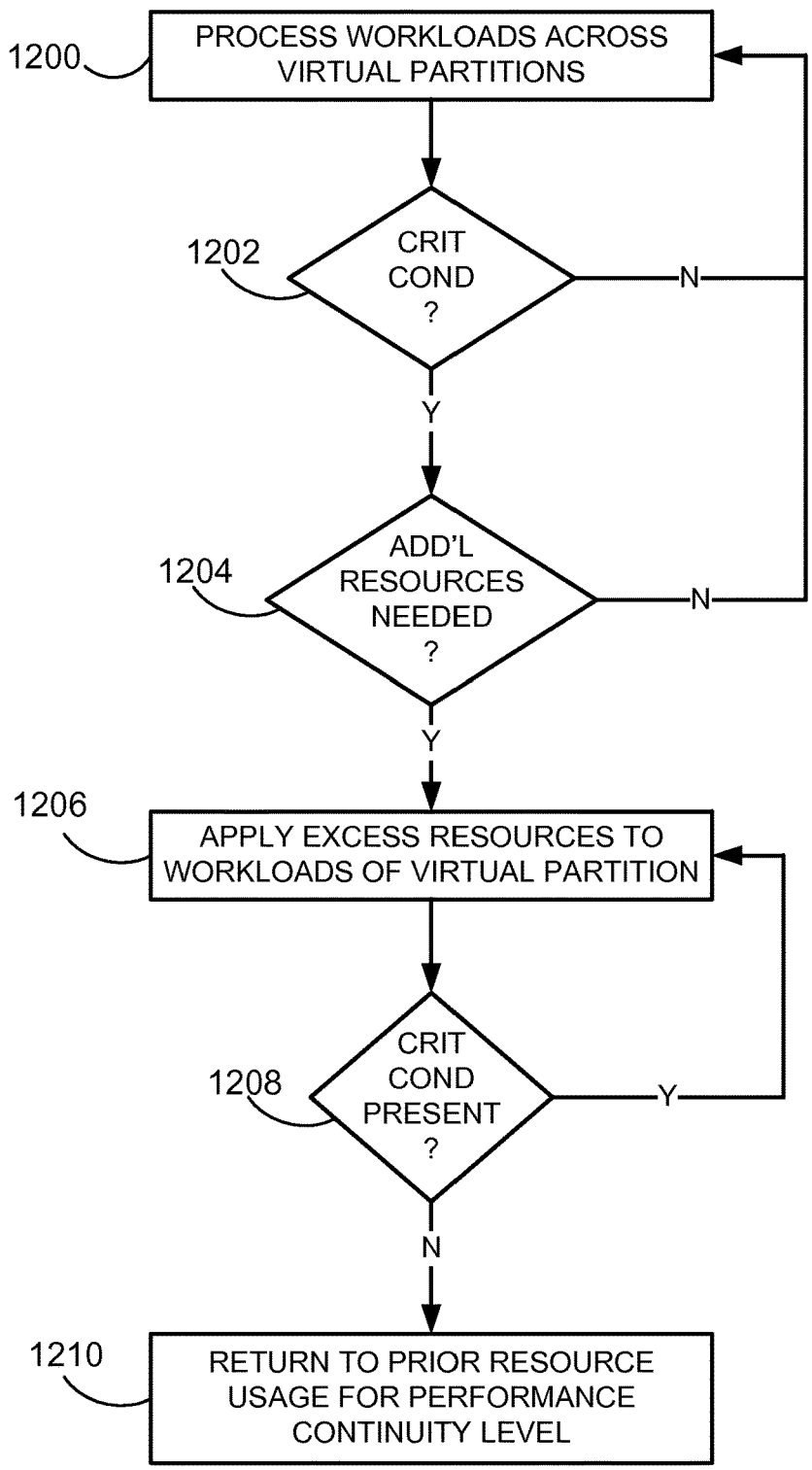
FIG. 12 is an operational flow diagram of example operation of a database system using performance continuity management to manage virtually-partitioned workloads.

FIG. 12 is an operational flow chart of example operation of the database system 102 during use of virtual partitions having independent performance control management percentages. In one example, the database system 102 may process workloads across multiple virtual partitions (1200). The virtual partitions may be independent virtual partitions or may be nested virtual partitions contained within another virtual partition. Upon detection of a critical condition (1202), the database system may determine whether or not workloads of a virtual partition require excess resources to maintain the performance continuity level (1204). If so, the database system 102 may apply excess resources to the workloads of the particular virtual partition requiring the resources to maintain the performance continuity level of the virtual partition (1206). Once the determination that any critical conditions are no longer present (1208), the resource usage level may be returned to the levels used prior to the existence of the critical condition to maintain the performance continuity level (1210).

The examples herein have been provided with the context of a relational database system. However, all examples are applicable to various types of data stores, such as file systems or other data stores suitable for organization and processing of data. Thus, performance continuity may be implemented in any suitable data store system and is not limited to use in a relational database system or any other database system. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A data store system comprising:
a storage array comprising a plurality of storage devices configured to store data; and
a processor array comprising a plurality of processors, the processor array in communication with the storage array, wherein the processor array is configured to provide processing resources; and wherein the processor array is configured to:
receive workloads to be performed on the data;
set a static processing resource usage level of the processing resources of the processor array, wherein the static processing resource usage level is less than a maximum available processing resource usage level, wherein the static processing resource usage level limits completion of received workloads at a level of performance to a predetermined number of received workloads when a total number of the received workloads exceeds the predetermined number of received workloads and completion of a number of received workloads that exceeds the predetermined number of workloads would cause a processing resource level of the processor array to exceed the static processing resource usage level, wherein the static processing resource usage level is maintained when the total number of received workloads exceeds the predetermined number of received workloads; and
process the received workloads at a processing resource usage level that does not exceed the static processing resource usage level in response to presence of predetermined operating conditions.

2. The data store system of claim 1, wherein the processor array is further configured to:
detect a change from the predetermined operating conditions; and
increase the processing resource usage level in response to detection of the change from the predetermined operating conditions, wherein the increase in processing resource usage level maintains the completion of at least the predetermined number of received workloads.

3. The data store system of claim 2, wherein the processor array is further configured to:
detect a return to the predetermined operating conditions present prior to the detected change; and
reduce the processing resource usage level in response to detection of the change in the predetermined operating conditions, wherein the reduction in processing resource usage level maintains the completion of at least predetermined number of received workloads.

4. The data store system of claim 1, wherein the processor array is further configured to:
   receive workloads associated with a first workload tier and workloads associated with a second workload tier, wherein the workloads associated with the first workload tier and the workloads associated with the second workload tier are to be completed in accordance with the level of performance;
   determine the static processing resource usage level, wherein the static processing resource usage level limits completion of received workloads associated with the first workload tier at the level of performance to at least a first predetermined number of received workloads when a number of the received workloads associated with the first workload tier exceeds the first predetermined number of received workloads and completion of received workloads associated with the second workload tier at the level of performance to at least a second predetermined number of received workloads when a number of the received workloads associated with the second workload tier exceeds the second predetermined number of received workloads, wherein the first predetermined number of received workloads is different that the second predetermined number of received workloads; and
   process the workloads associated with the first workload tier and the workloads associated with the second workload tier at processing resource level that does not exceed the static processing resource usage level in response to presence of predetermined operating conditions.

5. The data store system of claim 4, wherein the processor array is further configured to:
   detect a change from the predetermined operating conditions; and
   increase the processing resource usage level in response to detection of the change from the predetermined operating conditions, wherein the increase in processing resource usage level maintains the completion of at least one of the first predetermined number of received workloads associated with the first workload tier and the second predetermined number of received workloads associated with the second workload tier.

6. The data store system of claim 1, wherein the processor array is further configured to:
   determine a first planned environment, wherein the first planned environment is associated with a one of a time-based and event-based occurrence;
   detect occurrence of the first planned environment; and
   adjust the processor resource usage level in response to the occurrence of the first planned environment.

7. The data store of claim 1, wherein the processor array is further configured to:
   allocate the processing resources across a plurality of processing groups, wherein each processing group is allocated a respective portion of processing resources from the total amount of processing resources, wherein each of the processing groups is associated with a respective level of performance;
   receive workloads to be performed on data in a data store, wherein each workload is associated with one of the processing groups, and wherein each one of the workloads is to be completed in accordance with a corresponding level of performance;
   determine, for each of the processing groups, a respective static processing resource usage level of allocated respective processing resources for each of the processing groups less than a maximum available processing resource usage level, wherein each respective static processing resource usage level limits completion of respective received workloads at the respective level of performance to a respective predetermined number of received associated workloads when a number of respective received workloads exceeds the respective predetermined number of received workloads; and
   process the workloads at corresponding processing resource levels that do not exceed the respective static processing resource usage level in response to presence of predetermined operating conditions.

8. A method comprising:
   receiving, with a processor, workloads to be performed on data of a data store, wherein the processor is configured to provide processing resources;
   setting a static processing resource usage level of the processing resources of the processor array, wherein the static processing resource usage level is less than a maximum available processing resource usage level, wherein the static processing resource usage level limits completion of received workloads at a level of performance to a predetermined number of received workloads when a total number of the received workloads exceeds the predetermined number of received workloads and completion of a number of received workloads that exceeds the predetermined number of workloads would cause a processing resource level of the processor array to exceed the static processing resource usage level, wherein the static processing resource usage level is maintained when the total number of received workloads exceeds the predetermined number of received workloads; and
   processing; with the processor, the received workloads a processing resource usage level that does not exceed the static processing resource usage level in response to presence of predetermined operating conditions.

9. The method of claim 8 further comprising:
   detecting, with the processor, a change from the predetermined operating conditions; and
   increasing, with the processor, the processing resource usage level in response to detection of the change from the predetermined operating conditions, wherein the increase in processing resource usage level maintains the completion of at least the predetermined number of received workloads.

10. The method of claim 9 further comprising:
    detecting, with the processor, a return to the predetermined operating conditions present prior to the detected change; and
    reducing, with the processor, the processing resource usage level in response to detection of the change in the predetermined operating conditions, wherein the reduction in processing resource usage level maintains the completion of at least the predetermined number of received workloads.

11. The method of claim 8, wherein receiving, with the processor, the workloads to be performed on the data of the data store comprises receiving, with the processor, workloads associated with a first workload tier and workloads associated with a second workload tier, wherein the workloads associated with the first workload tier and the workloads associated with the second workload tier are to be completed in accordance with a level of performance, the method further comprising:
   determining, with the processor, the static processing resource usage level, wherein the static processing resource usage level limits completion of received workloads associated with the first workload tier at the level of performance to at least a first predetermined number of received workloads when a number of the received workloads associated with the first workload tier exceeds the first predetermined number of received workloads and completion of received workloads associated with the second workload tier at the level of performance to at least a second predetermined number of received when a number of the received workloads associated with the second workload tier exceeds the second predetermined number of received workloads, wherein the first predetermined number of received workloads is different that the second predetermined number of received workloads; and processing, with the processor, the workloads associated with the first workload tier and the workloads associated with the second workload tier at processing resource level that does not exceed the static processing resource usage level in response to presence of predetermined operating conditions.

12. The method of 11 further comprising:
detecting, with the processor, a change from the predetermined operating conditions; and
increasing, with the processor, the processing resource usage level in response to detection of the change from the predetermined operating conditions, wherein the increase in processing resource usage level maintains the completion of at least one of the first predetermined number of received workloads associated with the first workload tier and second predetermined number of received workloads associated with the second workload tier.

13. The method of claim 8 further comprising:
determining, with the processor, a first planned environment, wherein the first planned environment is associated with a first set of one of a time-based or event based occurrence;
detecting, with the processor, occurrence of the first planned environment; and
adjusting, with the processor, the processor resource usage level in response to the occurrence of the first planned environment.

14. The method of claim 8, the method further comprising:
allocating, with the processor, the processing resources across a plurality of processing groups, wherein each processing group is allocated a respective portion of processing resources from the total amount of processing resources, wherein each of the processing groups is associated with a respective level of performance; wherein receiving; with the processor; the workloads to be performed on data of a data store comprises receiving, with the processor, workloads to be performed on data in a data store; wherein each workload is associated with one of the processing groups, and wherein each one of the workloads is to be completed in accordance with a corresponding level of performance; and
determining, with the processor, for each of the processing groups, a respective static processing resource usage level of allocated respective processing resources for each of the processing groups less than a maximum available processing resource usage level, wherein each respective static processing resource usage level limits completion of respective received workloads at the respective level of performance to respective predetermined number of received associated workloads when a number of respective received workloads exceeds the respective predetermined number of received workloads; and processing, with the processor, the workloads at corresponding processing resource levels that do not exceed the respective static processing resource usage level in response to presence of predetermined operating conditions.

15. A non-transitory computer-readable medium encoded with a plurality of instructions executable by a processor, the plurality of instructions comprising:
instructions to receive workloads to be performed on data of a data store;
instructions to set a static processing resource usage level of the processing resources of the processor array, wherein the static processing resource usage level is less than a maximum available processing resource usage level, wherein the static processing resource usage level limits completion of received workloads at a level of performance to a predetermined number of received workloads when a total number of the received workloads exceeds the predetermined number of received workloads and completion of a number of received workloads that exceeds the predetermined number of workloads would cause a processing resource level of the processor array to exceed the static processing resource usage level, wherein the static processing resource usage level is maintained when the total number of received workloads exceeds the predetermined number of received workloads; and
instructions to process the received workloads a processing resource usage level that does not exceed the static processing resource usage level in response to presence of predetermined operating conditions.

16. The non-transitory computer-readable medium of claim 15, wherein the plurality of instructions further comprises:
instructions to detect a change from the predetermined operating conditions; and
instructions to increase the processing resource usage level in response to detection of the change from the predetermined operating conditions, wherein the increase in processing resource usage level maintains the completion of at least the predetermined number of received workloads.

17. The non-transitory computer-readable medium of claim 16, wherein the plurality of instructions further comprises:
instructions to detecting, with the processor, a return to the predetermined operating conditions present prior to the detected change; and
instructions to reduce the processing resource usage level in response to detection of the change in the predetermined operating conditions, wherein the reduction in processing resource usage level maintains the completion of at least the predetermined number of received workloads.

18. The non-transitory computer-readable medium of claim 16, wherein the instructions to receive the workloads to be performed on the data of the data store comprise instructions to receive, workloads associated with a first workload tier and workloads associated with a second workload tier, wherein the workloads associated with the first workload tier and the workloads associated with the second workload tier are to be completed in accordance with a level of performance, the plurality of instructions further comprising:

instructions to determine the static processing resource usage level, wherein the static processing resource usage level limits completion of received workloads associated with the first workload tier at the level of performance to at least a first predetermined number of received workloads when a number of the received workloads associated with the first workload tier exceeds the first predetermined number of received workloads and completion of received workloads associated with the second workload tier at the level of performance to at least a second predetermined number of received workloads when a number of the received workloads associated with the second workload tier exceeds the second predetermined number of received workloads, wherein the first predetermined number of received workloads is different that the second predetermined number of received workloads; and instructions to process the workloads associated with the first workload tier and the workloads associated with the second workload tier at processing resource level that does not exceed the static processing resource usage level in response to presence of predetermined operating conditions.

19. The non-transitory computer-readable medium of claim 16, wherein the plurality of instructions further comprises:

instructions to detect a change from the predetermined operating conditions; and instructions to increase the processing resource usage level in response to detection of the change from the predetermined operating conditions, wherein the increase in processing resource usage level maintains the completion of at least one of the first predetermined number of received workloads associated with the first workload tier and the second predetermined number of received workloads associated with the second workload tier.

20. The non-transitory computer-readable medium of claim 16, wherein the plurality of instructions further comprises:

instructions to determine a first planned environment, wherein the first planned environment is associated with a first set of one of a time-based or event based occurrence; instructions to detect occurrence of the first planned environment; and instructions to adjust the processor resource usage level in response to the occurrence of the first planned environment.

* * * * *